Feb. 14, 1933.　　　　　G. MIDBOE　　　　　1,897,269
BEACH LANDING GEAR
Filed June 21, 1932　　　4 Sheets-Sheet 1

INVENTOR
Gabriel Midboe
BY Toulmin & Toulmin
ATTORNEYS

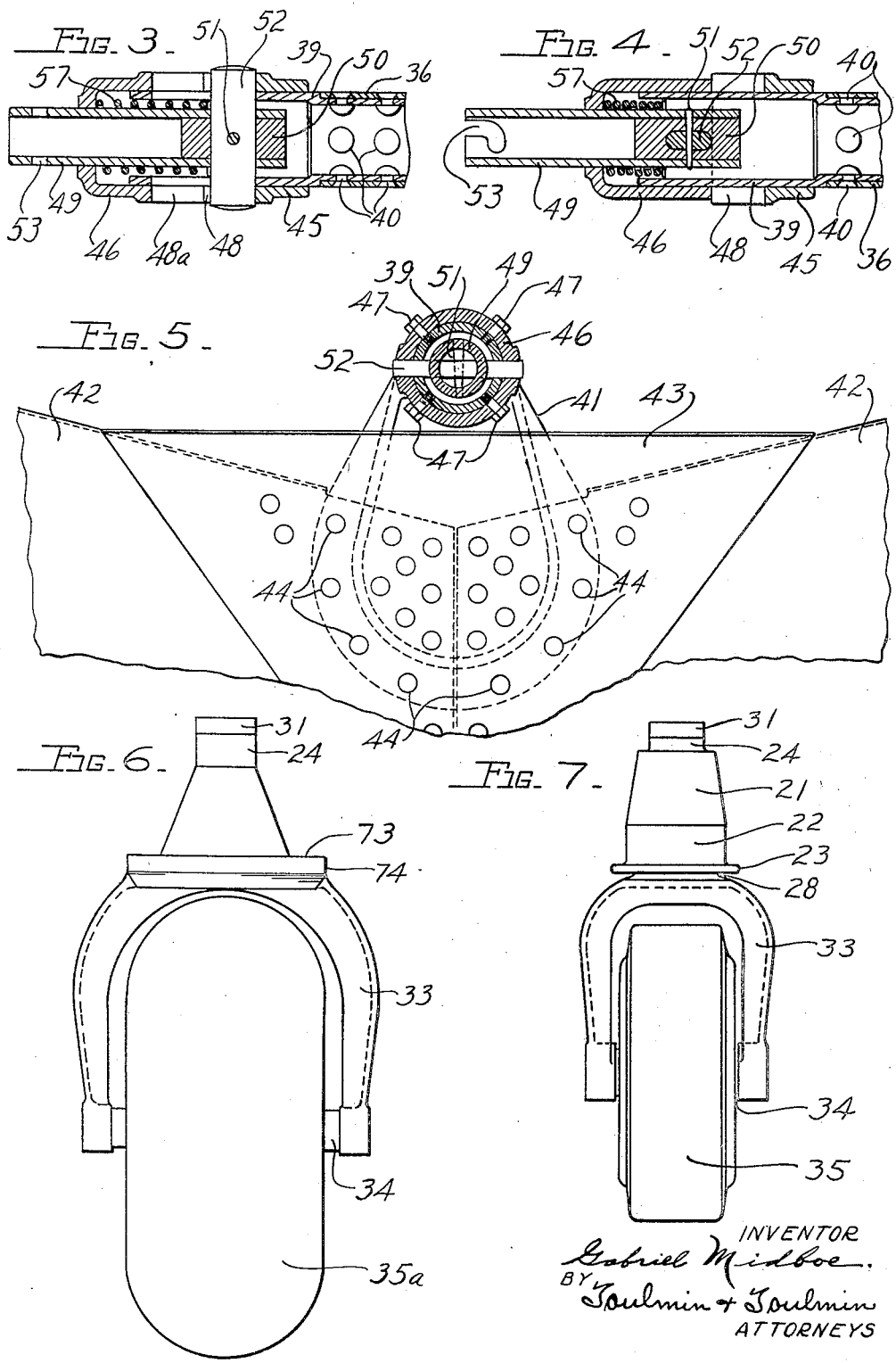

Feb. 14, 1933.  G. MIDBOE  1,897,269
BEACH LANDING GEAR
Filed June 21, 1932  4 Sheets-Sheet 3

INVENTOR
Gabriel Midboe
BY
Toulmin & Toulmin
ATTORNEYS

Feb. 14, 1933.                G. MIDBOE                1,897,269
                           BEACH LANDING GEAR
                          Filed June 21, 1932           4 Sheets-Sheet 4
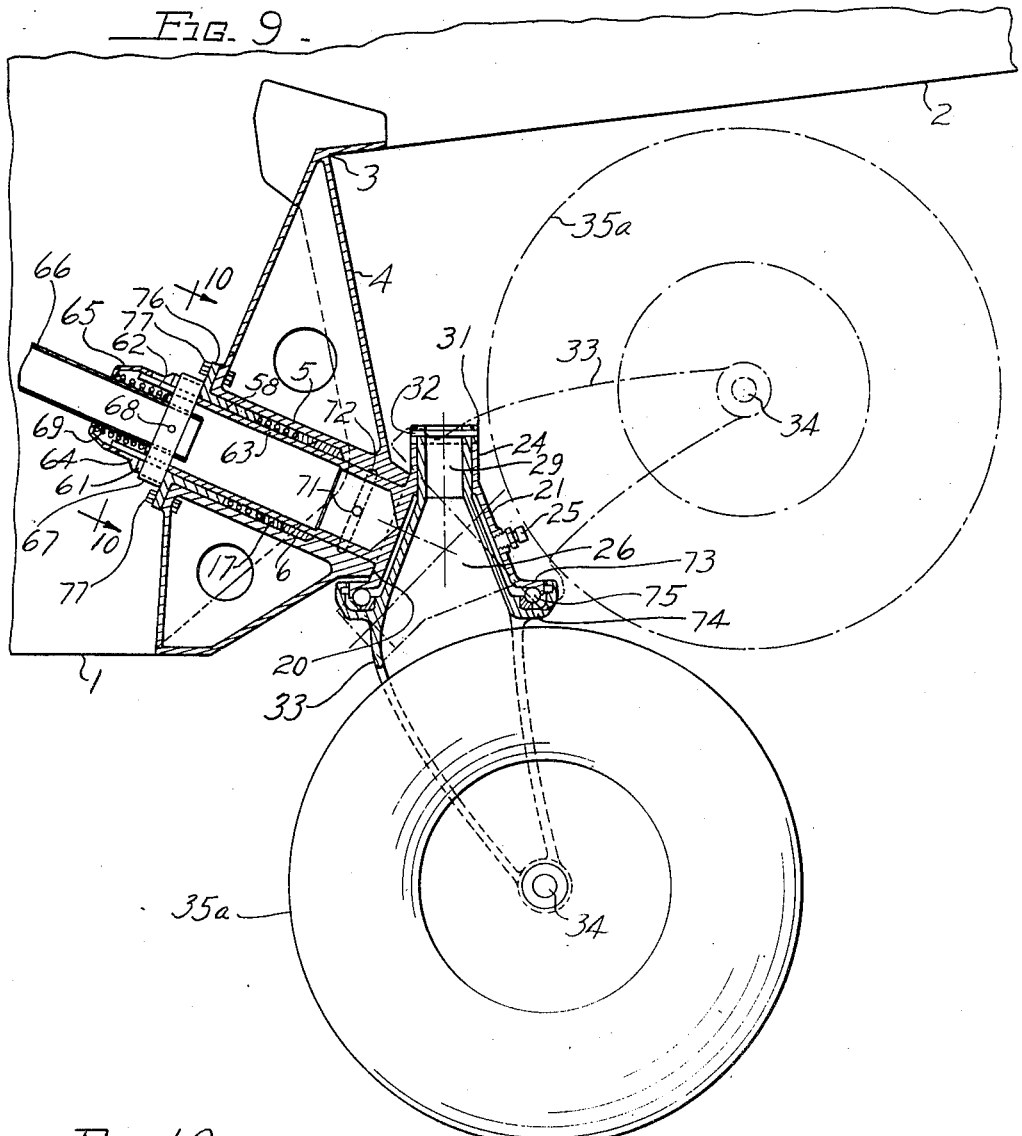
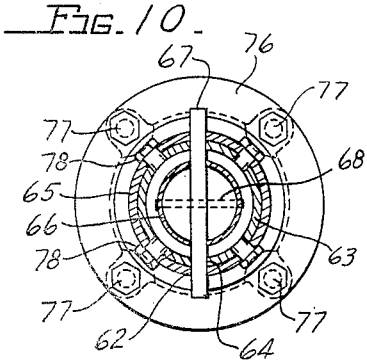
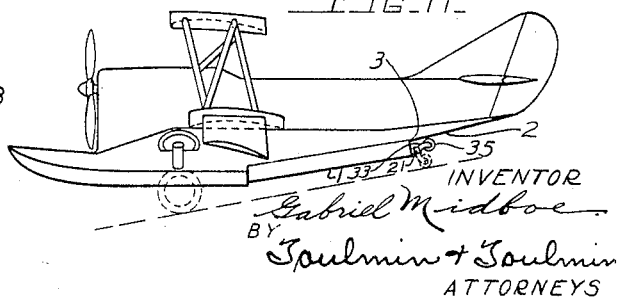
INVENTOR
Gabriel Midboe
BY
Toulmin + Toulmin
ATTORNEYS Patented Feb. 14, 1933

1,897,269

UNITED STATES PATENT OFFICE

GABRIEL MIDBOE, OF DUNDALK, MARYLAND, ASSIGNOR TO GENERAL AVIATION CORPORATION, OF DUNDALK, MARYLAND, A CORPORATION OF MARYLAND

BEACH LANDING GEAR

Application filed June 21, 1932. Serial No. 618,523.

This invention relates to improvements in landing gear for airplanes, and has for its object to provide a landing gear that is adapted to be used in connection with hydroplanes and to cooperate with the boat structure of the hydroplane for properly positioning the airplane on a beach, or other land surface.

It is also an object of this invention to provide, in connection with a hydroplane, a retractable landing gear located behind a part of the boat structure so that when the hydroplane is in the air the landing gear will not offer any resistance to the passing of the hydroplane through the air, but when it is desired to land the gear structure may be shifted from an inoperative to an operative position for landing purposes.

It is also an object of this invention to provide, in connection with the body structure of a hydroplane, a shaft and operating mechanism for the shaft, whereby the shaft may be either rotated or locked in one of two or more positions against rotation. This locking and operating mechanism may be located in any desired position along the shaft, but preferably it is located at one end while at the other end there is provided a housing for properly supporting a yoke having a spindle thereon mounted in proper bearings in the housing, and a wheel carried by the yoke.

It is particularly the object of this invention to provide, in connection with a hydroplane having a step-like structure, means for supporting a landing gear at the rear of said step-like structure, and to provide in connection with said landing gear, means for shifting it from an operative position to an inoperative position, and for holding it in either of said positions.

It is a further object to provide in connection with a shaft supporting and operating a retractable landing gear, a plurality of lubricant chambers in connection with a bearing for said shaft.

These and other advantages will appear from the following description taken in connection with the drawings.

Referring to the drawings:

Figure 3 is a section on the line 3—3 of Figure 2. In this position the locking bar engages the sleeve to prevent the rotation of the shaft structure.

Figure 4 is a view similar to Figure 3 but with the shaft-operating means in a position at right angles to that shown in Figure 3.

Figure 5 is a section on the line 5—5 of Figure 1.

Figure 6 is an end elevation of one of the wheel-supported yokes with a pneumatic tired wheel shown in connection therewith.

Figure 7 is a view similar to Figure 6 but showing a solid rubber tire.

Figure 9 is a vertical section through another form of beach landing gear.

Figure 10 is a section on the line 10—10 of Figure 9.

Figure 11 is a diagrammatic view showing the wheels in operative position in dotted line.

Figures 1, 2:
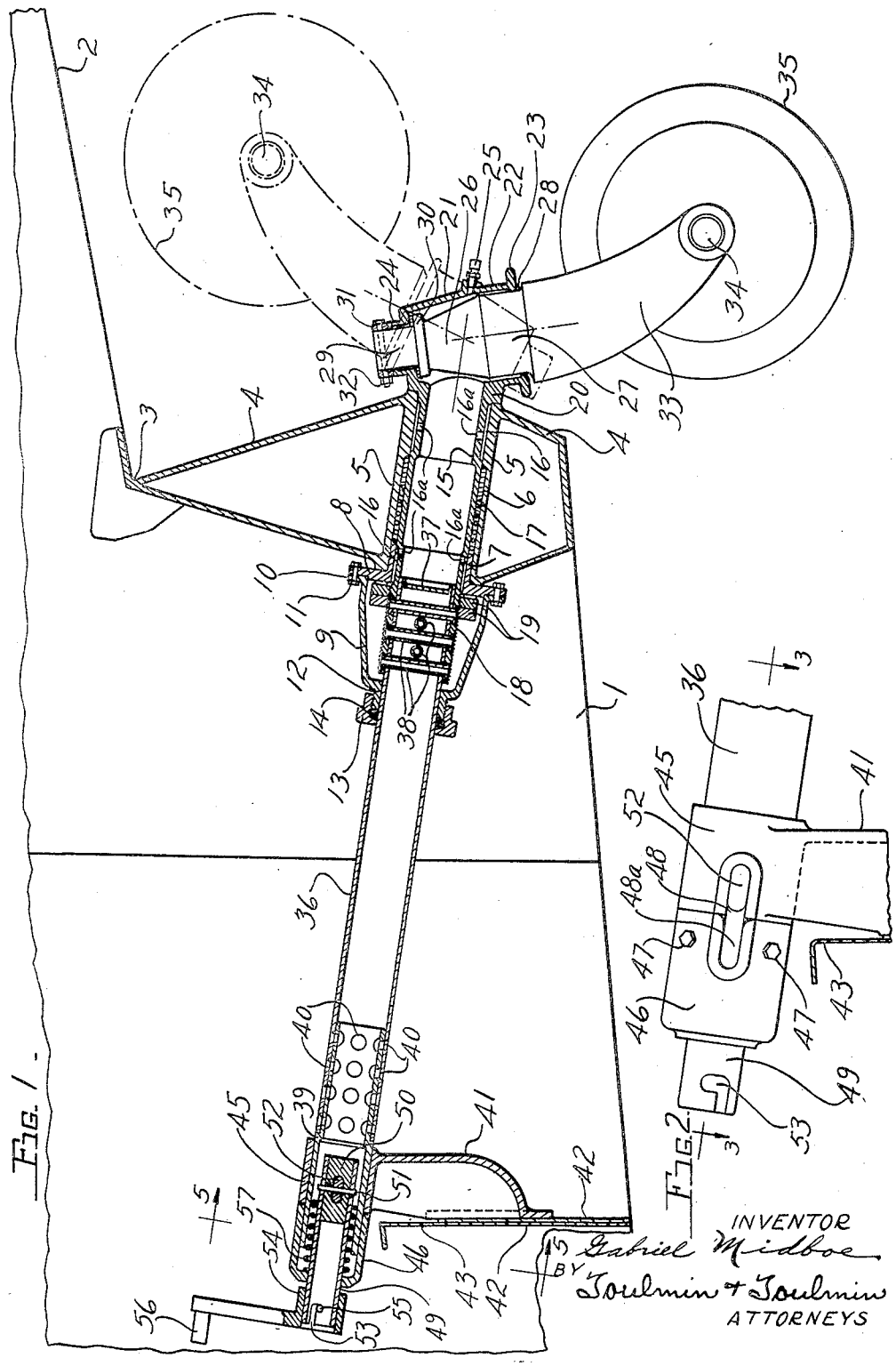
Figure 1 is a longitudinal vertical section through applicant's beach landing gear showing a part of the airplane body to which the landing gear is attached.
Figure 2 is a detail showing one of the bearings for the shaft structure, and the means for locking and rotating the shaft structure.

The present beach landing gear is particularly well adapted for use in connection with hydroplanes, but may be used with other forms of airplanes. In the drawings the landing gear is shown in use in connection with a hydroplane, where the step is employed to shield the gear from the slip stream.

The numeral 1 designates the body structure of the boat part of a hydroplane. This numeral 1 is used to designate the forward or front end of the boat structure, while the numeral 2 is used to designate the rear part of the boat structure, which forms with the front part a step mechanism 3. In this step mechanism, between the two parts of the boat structure, there is located a frame 4. In the present instance the upper part of this frame is in the form of a wedge or pyramid, and the lower part is in the form of a trapezium.

Extending through the other part of this frame 4 is a cylindrical bearing 5, which has at its inner end an enlargement 6. Extending into the enlarged end of the bearing 5 is a sleeve 7, which cooperates with the bearing in forming a lubricant chamber in the enlarged part of the bearing. On the outer end of the sleeve 7 is a flange 8, to which a cap-like member 9 is attached by means of bolts 11 passing through a flange 10 around the open end of the cap. The other end of the cap has a cylindrical extension 12, which forms a bearing. Threaded on this extension is a cap 13 which cooperates with the extension in holding a packing 14 around a shaft extension 36 that passes through the bearing 12.

Rotatably mounted in the bearing 5 is a tubular shaft 15, which has around it adjacent one end, a groove 16. This shaft is hollow and has extending through the walls thereof holes 16a, leading into the groove 16 for the transmission of a lubricant. The enlarged part of the bearing forms with this hollow shaft a lubricant chamber in which there is a lubricant retaining packing 17. One end of the shaft 15 is threaded at 18 to receive a pair of nuts 19 which cooperate with a shoulder 20 on the other end of the shaft in holding the sleeve 7 properly positioned in the enlarged part of the bearing, and the flange 8 against one end of the bearing.

On the end of the tubular shaft 15 adjacent the shoulder 20 is a housing 21, which provides a lower somewhat large bearing 22 with a flange 23 around it, and an upper bearing 24, somewhat smaller than the first-named bearing. These bearings are so arranged in the housing that a line through the center thereof is out of perpendicular with a line passing through the center of the tubular shaft 15. In one side of the housing is an oil plug 25 through which a lubricant may be passed into the housing for lubricating the various bearing elements.

The housing is adapted to support a wheel structure consisting of a spindle 26 having a lower trunnion part 27 and a shoulder 28 adjacent thereto. This shoulder and trunnion are at one end of the spindle, while at the other and reduced end of the spindle there is an upper trunnion part 29 with a shoulder 30 immediately below the trunnion. On the outer end of the upper trunnion part 29 is a ring 31 attached thereto by means of a bolt 32. The upper trunnion works in the upper bearing 24, while the lower trunnion part works in the lower bearing 22.

Adjacent the shoulder 28 and integral with the spindle is a yoke member 33, which has extending through the lower ends of the arms thereof a spindle 34, on which a wheel 35 is mounted between the arms. On this wheel a pneumatic tire 35a is mounted.

There is provided in connection with the tubular shaft 15 a tubular extension 36, which forms an operative part of the tubular shaft. This extension extends at one end into the threaded end of the shaft 15 and is attached thereto by means of tubular rivets 38. Between the end of the extension 36 and the tubular rivets is a closure disc 37. This closure disc serves to separate that part of the shaft 15 within the bearing 5 from that part of the shaft within the cap 9. This cap 9 not only serves to support the bearing 12 but serves as a casing or chamber for containing a lubricant by which the bearing 12 may be lubricated. The extension 36 passes through the bearing 12 and the packing 14.

To the other end of the tubular extension 36 there is attached a tubular member 39 by means of rivets 40. This tubular member 39 is supported by a bracket 41, which has on its upper end a sleeve 45 and which is attached to a frame 42 and a plate 43 by means of rivets 44 which support the bracket on the frame and the plate, and the plate on the frame. On the end of the tubular member 39 and fitting close to the sleeve 45 is a cap 46 attached thereto by means of screws 47. The sleeve 45 has therein diametrically disposed notches 48, while the tubular extension 39 and the cap 46 have therein oppositely disposed slots 48a adapted to align with the notches 48 when the handle structure is in certain rotary positions.

In the end of the tubular member 39 and the cap 46 is a hollow stem 49 which has in its inner end a plug 50. Extending through the plug and the inner end of the hollow stem is a lock bar 52. This lock bar and plug 50 are held in position in the stem by means of a pin 51. The outer end of the hollow stem is provided with bayonet slots 53. Extending over this end of the stem is a sleeve 54, which has extending through it a pin 55 for engaging the stem in the bayonet slots. On this sleeve is a handle 56, by means of which the shaft structure may be rotated. The spindle 49 is movable longitudinally in the cap 46, but is held in its inmost position by means of a spring 57, which is located between the small end of the cap and the lock bar 52.

Figure 8:
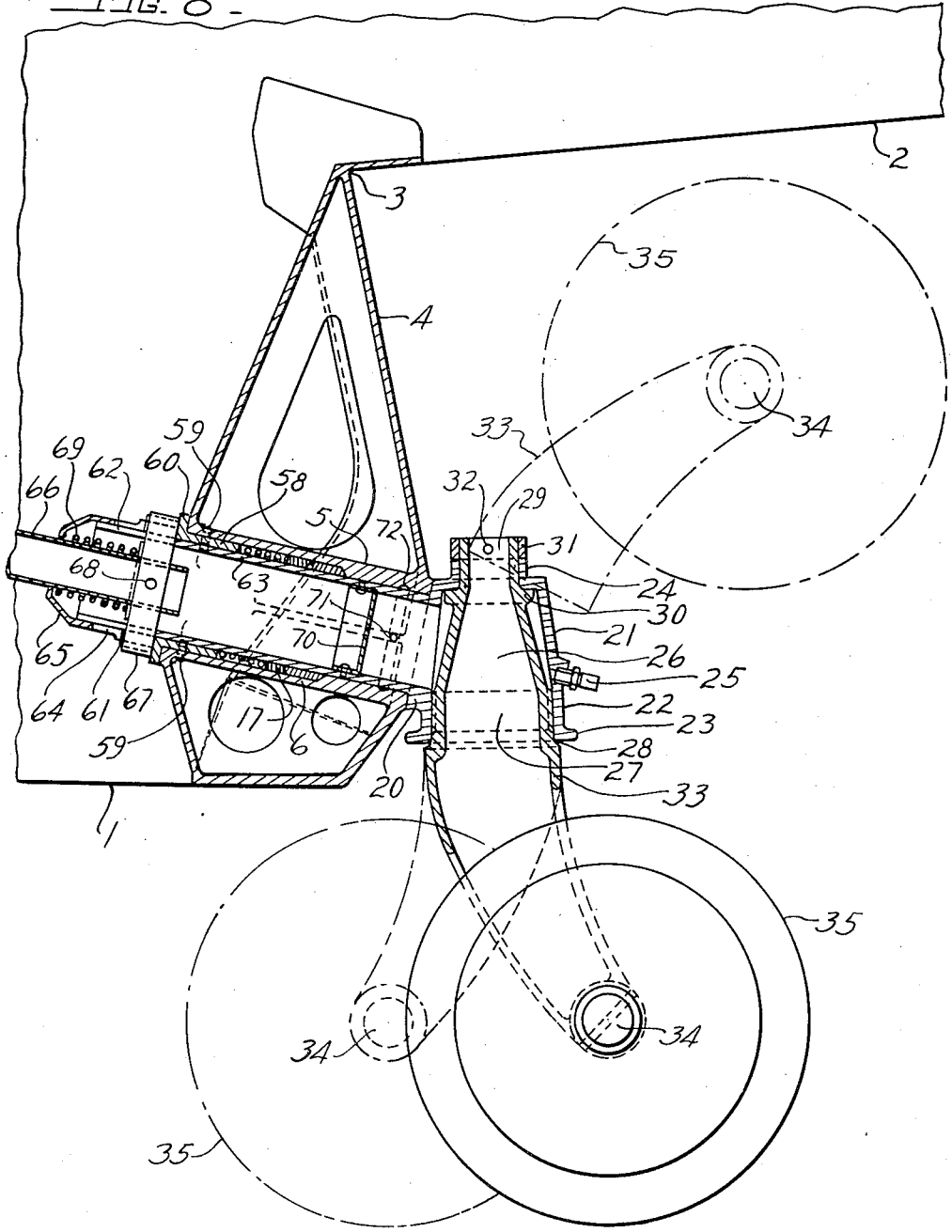
Figure 8 is a vertical longitudinal section through a slightly modified form of beach landing gear.

In the form shown in Figure 8 the sleeve fitting within the enlarged end of the bearing 5 is indicated by the numeral 58, and has on its outer end a flange 60 abutting one end of the bearing 5. This sleeve is held in position within the enlarged part of the bearing by means of screws 59. The sleeve 58 extends outwardly beyond the flange 60 and has slots 61 therein to receive a transversely disposed lock bar 67. The tubular shaft is indicated by the numeral 63 and has in its inner end slots 62. Fitting over this end of the shaft is a cap 65, which has slots 64 therein in line with the slots in the tubular shaft.

Extending through the small end of the cap 65 is a tubular shaft 66, which has on its inner end a lock bar 67, held thereto by means of a pin 68. Between this bar and the small end of the cap is a spring 69, which tends to hold the lock bar 67 in the slots 61. When this lock bar 67 is in the slots 61 the shaft 63 is held against rotation. In order to rotate the shaft the lock bar is withdrawn from the slots 61 and into the outer ends of slots 62 so that this bar is free from the end of the sleeve and the rotation of the shaft 66 will cause the lock bar 67 to rotate and carry with it the shaft 63.

Near the outer end of the shaft 63 there is provided a disc 70. Between this disc 70 and the outer end of the shaft there is a plurality of oil holes 71, extending through the walls of the shaft into an oil groove 72 on the inside surface of the bearing 5, as shown in Figure 8. On the end of this shaft 63 is the housing, the same as that found in connection with the form shown in Figure 1. This housing and the associated structure are in all respects similar to those shown in the preferred form.

In Figure 9 there is shown a slightly modified form of gearing support. In this form the housing is provided with a runway 74 instead of the flange 23. The shoulder 20 is replaced by a runway 73, which cooperates with the runway 74 to form a ball race in which balls 75 are located for antifriction purposes. In this form the flange on the sleeve 58 is indicated by the numeral 76, and instead of screws 59 through the bearing into the sleeve, screws 77 are provided through the flange 76 into the adjacent part of the frame 4 for holding the sleeve within the enlarged part of the bearing 5. The cap 65 is held on the inner end of the tubular shaft in this form and also in the form shown in Figure 8 by means of screws 78.

When it is desired to use the gear for landing purposes the shaft structures are rotated to bring the wheels to the position shown in heavy line in Figures 1, 8 and 9. When it is desired to retract the wheels the shaft constructions are rotated so that the wheels will assume the position shown in dotted line in these figures. Here the wheels are located behind the step structure 3 so they are out of the way and will cause no resistance to the air through which the plane is passing. In the event it is desired to use the wheels for landing purposes the shafts are rotated through half a circle, thereby bringing the wheels to a position below the body of the hydroplane, as shown in these figures.

It is desired to comprehend within this invention such modifications as may be embraced within the claims and the scope of the invention.

Having thus fully described the invention, what is claimed as new and desired to be secured by Letters Patent, is:

1. In a landing gear, in combination with a body structure, a rotatable shaft supported in bearings on the body structure and having at one end a housing, and a wheel structure mounted on the shaft in the housing for rotation therewith.

2. In a landing gear, in combination with a body structure having a cylindrical bearing therein, a shaft mounted for rotation in the bearing and extending into the body structure, a housing on one end of the shaft, and a caster rotatably supported by the housing for rotation with the shaft.

3. In a landing gear, in combination with a body structure, a shaft mounted for rotation in bearings in the body structure, a housing on one end of the shaft, said housing having a pair of bearings therein, and a caster, said caster having a spindle projecting into the housing and engaging the bearings.

4. In a landing gear, in combination with a body structure, a shaft mounted for rotation in bearings in the body structure, a housing on one end of the shaft, said housing having a large bearing and a small bearing, and a caster, said caster having a spindle with a large trunnion part for the large bearing and a small trunnion part for the small bearing.

5. In a landing gear in combination with a body structure having a bearing therein, a shaft supported in the bearing for rotation, a housing on one end of the shaft, said housing having a large bearing and a small bearing, and a caster having at one end a wheel and at the other end a spindle, said spindle having a large trunnion part adjacent the roller for engaging the large bearing, and a small trunnion part for engaging the small bearing.

6. In a landing gear, in combination with a body structure having a bearing therein, a shaft supported in the bearing for rotation, means on the shaft to prevent its longitudinal movement in the bearing, a housing on one end of the shaft, said housing having spaced bearings therein, and a caster having a spindle projecting into the housing in engagement with the bearings.

7. In an airplane, a body having a step, a landing wheel having a forwardly extending shaft rotatably mounted in said step so that the wheel is adapted in one position to extend below the step and in another position to be concealed by the step.

8. In an airplane, a body having a step, a landing wheel, a support for the wheel rotatably mounted in said step adapted in one position to support the wheel below the step and in another position to support the wheel behind the step, and swivel means for mounting said wheel on its rotatable support.

9. In an airplane, a body having a step, a landing wheel, a support for the wheel rotatably mounted in said step adapted in one position to support the wheel below the step and in another position to support the wheel behind the step, swivel means for mounting said wheel on its rotatable support, and means to lock said wheel in its alternate position.

10. In a landing gear, in combination with a body structure having a bearing therein enlarged at one end, a sleeve in the enlarged end of the bearing forming with the bearing an oil chamber, a cap supported on the sleeve, a bearing in the cap, a shaft extending through the first bearing, said shaft having on one end a shoulder engaging one end of the bearing and on the other an adjustable member to engage the sleeve to force it into the other end of the bearing, an extension fastened to the shaft and supported in the cap bearing, and a wheel structure on the shaft adjacent the shoulder.

11. In a landing gear, in combination with a body structure, a shaft having an extension, a bearing for the shaft supported by the body structure, a cap-like member supported by said bearing and forming a bearing for one end of the extension, and a bearing for the other end of the extension supported by the body structure.

12. In a landing gear, in combination with a body structure, a shaft having an extension, a bearing for the shaft supported by the body structure, a cap-like member supported by said bearing and forming a bearing for one end of the extension, a bearing for the other end of the extension supported by the body structure, and means cooperating with the last-named bearing to prevent the extension and the shaft from turning.

13. In a landing gear, in combination with a body structure, a shaft having at one end a wheel structure and at the other end an extension, means for supporting said shaft and extension, and means engaging the extension for rotating the shaft, said means including a stem extending into the extension and a transverse member engaging the extension and adapted to engage a support for the shaft.

14. In a landing gear, in combination with a body structure, a shaft having at one end a wheel structure and at the other end an extension, a plurality of bearings for supporting the shaft and the extension, and means in one position to cooperate with one of the bearings and the extension to prevent the rotation of the shaft and in another position to rotate the shaft to shift the position of the wheel, and a wheel.

15. In a landing gear, in combination with a body structure, a shaft structure, a plurality of supports on the body structure for said shaft structure, one of said supports comprising a sleeve having a notch therein, means engaging the shaft structure to rotate it and adapted to engage the sleeve in the notch to lock the shaft against rotation, and a wheel supported on the shaft structure.

16. In a landing gear, in combination with a body structure having a plurality of supports, one of which consists of a sleeve having a notch therein, a shaft structure in said supports, a cap attached to said shaft structure, said cap and shaft having a slot therein, means slidable in the slot for rotating the shaft structure and adapted to engage the sleeve in the notch to prevent the shaft structure from rotating, and a wheel structure on the shaft structure.

17. In a landing gear, in combination with a body structure having a plurality of supports, one of which consists of a sleeve having a notch therein, a shaft structure in said supports, a cap attached to said shaft structure, said cap and shaft having a slot therein, means soluble in the slot for rotating the shaft structure and adapted to engage the sleeve in the notch to prevent the shaft structure from rotating, and a wheel structure on the shaft structure, said wheel structure consisting of a yoke having a wheel thereon and a spindle extending from the yoke and supported by the shaft structure.

18. In a landing gear, in combination with a body structure having a plurality of supports, one of which consists of a sleeve having a notch therein, a shaft structure in said supports, said shaft having at one end a housing and in the other end a slot, means slidable in the slot for rotating the shaft structure and adapted to engage the sleeve in the notch to prevent the rotation of the shaft structure, and a wheel structure supported by the housing, said wheel structure consisting of a yoke having a wheel thereon and a spindle rotatably supported by the housing, whereby a rotation of the shaft structure will change the position of the wheel structure.

19. In a landing gear, a wheel, a shaft structure for supporting and moving the wheel from one position to another, a sleeve for supporting one end of the shaft structure, said sleeve having a notch therein, and means on the shaft structure for rotating it adapted to engage the sleeve in the notch to prevent the rotation of the shaft structure.

20. In a landing gear, a wheel, a tubular member connected to the wheel for moving the wheel from one position to another, a sleeve supporting the tubular member, said sleeve having a notch therein, a cap on one end of the tubular member and against the sleeve, said cap and tubular member having a slot therein, a part of which slot being adapted to align with the notch, and means movable in the slot for rotating the tubular member when in one end of the slot and adapted when in the other end of the slot to engage the sleeve in the notch for locking the tubular member against rotation.

21. In a landing gear, a wheel, a tubular member connected to the wheel for moving it from one position to another, a sleeve supporting the tubular member, said sleeve having a notch therein, a cap on one end of the tubular member and against the sleeve, said cap and tubular member having a slot therein, a part of which slot being adapted to align with the notch, a longitudinally movable member in the cap, a bar on said longitudinally movable member projecting into said slot for rotating the tubular member when in one end of the slot and adapted when in the other end of the slot to engage the sleeve in the notch for locking the tubular member against rotation, and means tending to hold the bar in the notch.

22. In a landing gear, a wheel, a tubular member connected to the wheel for moving it from one position to another, a sleeve supporting the tubular member, said sleeve having a notch therein, a cap on one end of the tubular member and against the sleeves, said cap and tubular member having a slot therein, a part of which slot being adapted to align with the notch, a longitudinally movable member in the cap, a bar on said longitudinally movable member projecting into said slot for rotating the tubular member when in one end of the slot and adapted when in the other end of the slot to engage the sleeve in the notch for locking the tubular member against rotation, means tending to hold the bar in the notch, and a handle on the longitudinally movable means for rotating it.

23. In an airplane, a body having a casting forming a step, a forwardly disposed bracket mounted on said body within the body, said bracket and casting having aligned tubular bearings, a wheel shaft supported therein having a caster wheel at the outer end thereof adapted in one position to extend below the casting and in another position to be concealed within the step, and remotely controlled means for yieldingly locking and unlocking said wheel in its alternate positions.

24. In an airplane, a body having a step, a longitudinally disposed bearing member extending generally longitudinally of the body through the step, a caster wheel swiveled on the end thereof with the axis of its caster at right angles to the longitudinal axis of its bearing support, and means for rotating said wheel and its caster bodily about its support from a position where the wheel depends below the step to a position where it extends into and is concealed by the step.

In testimony whereof, I affix my signature.

GABRIEL MIDBOE.